Aug. 5, 1969   J. M. LAULAN   3,459,578

METHOD OF COATING BODIES BY ROTATION

Filed Oct. 18, 1965

Inventor
Jean M. Laulan
By Stevens, Davis, Miller & Mosher
Attorneys

United States Patent Office 3,459,578
Patented Aug. 5, 1969

3,459,578
METHOD OF COATING BODIES BY ROTATION
Jean Michel Laulan, Lyon, France, assignor to Rhone-Poulenc S.A., Paris, France, a French body corporate
Filed Oct. 18, 1965, Ser. No. 497,354
Claims priority, application France, Oct. 21, 1964, 992,169
Int. Cl. B44d 1/094, 1/02; B44c 1/18
U.S. Cl. 117—18                                    9 Claims

ABSTRACT OF THE DISCLOSURE

The invention provides a method of coating an article, e.g. corrugated tubing, in which a body is immersed in a fluidized bed of powdered plastic. The temperature of the article is sufficiently high to cause fusion of the powder particles. The body is then rotated about an axis while within the fluidized bed, is thereafter withdrawn and rotated at a sufficient speed to cause the fused plastic to flow outwardly from the recesses on the surface of the body to projections thereon to form a uniform coating.

---

The present invention relates to a method of forming coatings on bodies by rotation in a bed of coating material and moulded articles obtainable from such coated bodies.

Many methods of coating bodies have been proposed which consist in immersing a stationary body to be coated in a synthetic polymeric material in the form of a powder in a fluidized bed. It has been found that the immobility of the article to be coated during the immersion results in an accumulation of synthetic material on the upper surface of the body, and causes differences in the thickness of the coating or of the moulded article obtained by removing the coating from the body.

In order to obviate this disadvantage, it has been proposed, for example in French patent specification No. 1,293,725 to rotate the body to be coated, during the immersion, either continuously or discontinuously, at a uniform speed. While this method gives good results in the case of bodies having a plane or convex surface (sheets or pipes) of relatively uncomplicated form, the same is not the case with bodies the surface of which has projecting relief and recessed portions. In this case, it is found that an accumulation of material occurs in the recessed portions and that the portions in relief have insufficient material. Consequently, the coating obtained is of non-uniform thickness, the projecting portions being thinner than the recessed portions.

In the moulding of articles such as ringed tubes by immersing a hot mandrel preferably treated with a mould-release (or anti-adhesive) agent in a fluidized bed consisting of a pulverous thermosplastic polymer, it is found that this accumulation of material in the recessed portions causes the shaped article to offer considerable resistance to its detachment from the mandrel. More particularly, when the moulded articles are released from the mandrel by injection of compressed air between the coating and the mandrel, this resistance causes permanent deformations (elongation and widening of the shaped article). It has also been observed that, due to the reduction of the thickness of the portions in relief, the moulded articles obtained have poor compressive strength.

It has now been found that it is possible to provide bodies having recessed portions and portions in relief, with a coating of uniform thickness or having extra thickness in the portions in relief, by rotating the heated bodies in a fluidized bed of powdered polymeric synthetic material, withdrawing the bodies from the bed and subsequently centrifuging them while the coating of agglomerated plastices material is still plastic and deformable.

The present invention provides, therefore, a method of coating a body having a surface with projecting and recessed portions, which comprises immersing the body in a fluidised bed of synthetic polymeric material in powder form, the temperature of the body at the time of immersion being high enough to cause agglomeration by fusion of the powder particles, rotating the immersed body about an axis, withdrawing the coated body from the fluidized bed of polymeric material, and rotating the body at a centrifuging speed sufficient to exert a centrifugal force on the coating material while it is plastic.

The polymeric material employed may be selected from thermosetting resins or thermoplastic materials.

The thermosetting resins must be such as to have, during the stage when the coated body is centrifuged, a degree of cross-linking which will permit transfer of material from recessed portions in the surface of the solid to portions in relief. These resins include, in particular, epoxy resins, cross-linkable polyesters, phenol-formaldehyde prepolymers and silicone resins.

The thermoplastic materials constitute the class of polymeric materials which are most appropriate for carrying out the process of the invention. They may have incorporated in the powdered polymeric material conventional adjuvants such as fillers, stabilisers, pigments and plasticisers. Among the thermoplastic materials there may be mentioned, more particularly, polyvinyl chloride and the copolymers of vinyl chloride and vinyl acetate, polystyrene, polyethylene, polypropylene, ethylene-propylene copolymers, polyamides, linear polyesters, 1,3-butadiene-styrene copolymers or isoolefins, and fluorinated thermoplastic resins.

The temperature to which the body or mandrel to be coated is brought before its immersion depends upon its heat capacity and upon the polymeric material employed. In the case of a thermoplastic material, it must be so chosen as to produce, for example agglomeration and fusion of the particles of material on the surface of the body. In the case of a thermosetting material, the temperature must be sufficient to produce agglomeration and fusion of the particles without producing any premature hardening of the material.

The speed of rotation of the body during its immersion in the fluidized bed of powdered polymeric material depends upon the shape of the body and upon the density of the polymeric material employed.

The duration of the immersion depends upon the required thickness of the coating or of the finished moulded article. The immersion may take place continuously or in a number of successive stages until the desired thickness is obtained.

When the coated body after withdrawal from the fluid bed is centrifuged, the speed of rotation is fixed as a function of the plasticity of the material and of the desired transfer of material from the recessed portions. By way of example, it may be higher by 10 to 400 revolutions per minute (i.e. r.p.m.), and preferably by 50 to 200 r.p.m., than the speed employed during the immersion. The duration of this phase depends upon the same parameters and upon the speed of rotation.

The fluidization of the powdered polymeric material is effected by the usual methods and apparatus.

The process of the invention is suitable for the permanent or temporary coating of rotatable bodies such as ringed pipes, gearwheels, worms, screws for conveying corrosive liquid or solid products and solids of revolution in general. It is also suitable for the manufacture of hollow articles comprising ribs or corrugations, by moulding on an appropriate core or mandrel, for example the moulding of ringed tubes by rotation. This may be done by employing a metal mandrel of corresponding shape, to which any desired mould-release agent (for example a silicone oil) is advantageously applied before it is introduced into the polymeric material.

The invention is illustrated, merely by way of example in the accompanying drawings, in which.

Figure 1:
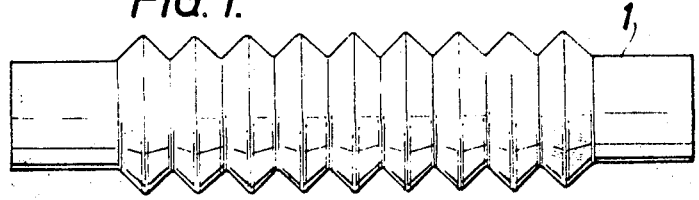
FIGURE 1 illustrates the mandrel 1 employed in the moulding of a ringed tube.
Figure 2:
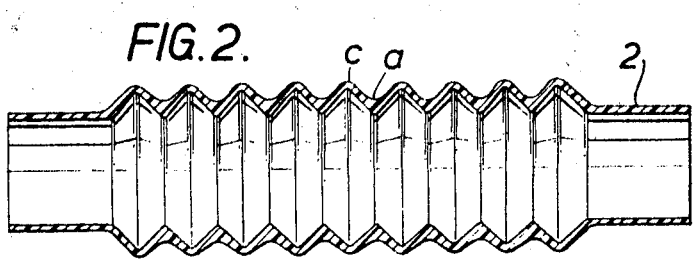
FIGURE 2 illustrates the longitudinal section of a ringed tube 2 obtained from such a mandrel without any centrifuging phase.
Figure 3:
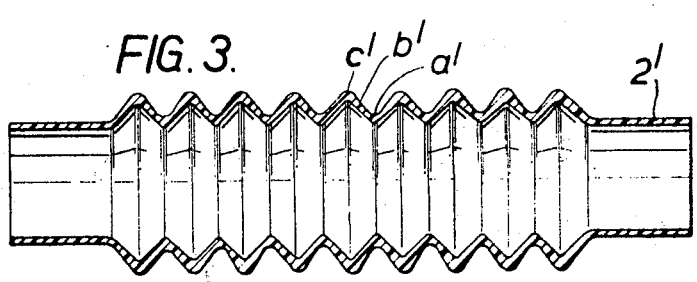
Figure 4:
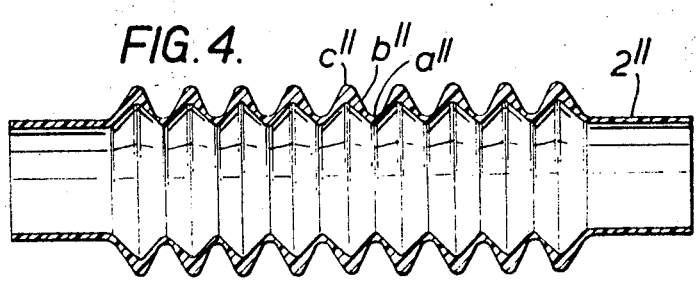
Figure 5:
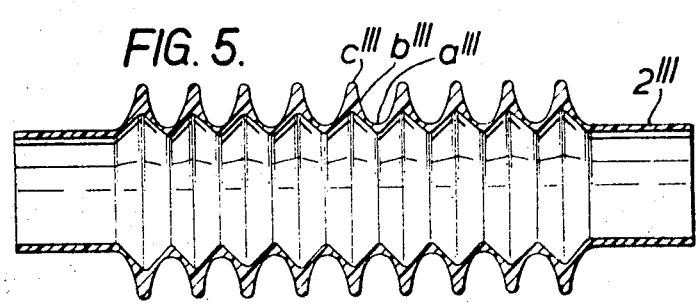

FIGURES 3, 4 and 5 illustrate longitudinal sections of ringed tubes 2', 2" and 2'" obtained from such a mandrel with increasing centrifuging periods.

In FIGURES 2 to 5, $a$, $a'$, $a''$ and $a'''$ indicate points at the base of the groove of the tube, $b'$, $b''$ and $b'''$ indicate the thinnest point of the tube and $c$, $c'$, $c''$ and $c'''$ indicate the crest of the ribs of the tube.

The following example illustrates the invention.

Example

With the aid of apparatus provided with a rotary drive means, a ringed steel mandrel having a maximum diameter of 30 mm. and a minimum diameter of 20 mm. and a distance between rings of 10 mm. and a length of 500 mm., and which is treated with a film of silicone oil, is immersed in a fluidized bed of polyvinyl chloride (containing 40% of butyl phthalate as plasticiser). The mandrel at a temperature of 300° C. is rotated at 150 r.p.m. After immersion in the bed for 5 seconds, the mandrel is withdrawn from the fluidized bed for 5 seconds to permit smoothing of the deposit. This operation is repeated twice. After the third immersion, the mandrel when withdrawn from the bed is rotated for 30 seconds at 350 r.p.m. to exert a centrifugal force on the coating material and then cooled with water.

Release of the tube from the mandrel is effected by injection of compressed air between the plastic coating formed and the mandrel by means of a device known per se.

The tube obtained in this way is readily removed from the mould. It has a regular diameter from one end to the other. Its length is equal to that of the mandrel. It comprises rings, the radius of curvature of which is very small and the same as that of the mandrel. Its thickness, at the points denoted by $a'''$, $b'''$ and $c'''$ in FIGURE 4, is as follows:

| | Mm. |
|---|---|
| $a'''$ (base of groove) | 0.95 |
| $b'''$ (thinnest point) | 0.5 |
| $c'''$ (crest of rib) | 3 |

This tube, of which the portions projecting in relief are substantially thicker than the recessed portions, may be compressed in length, which results in a saving of space during storage. It is of great flexibility and does not collapse when folded.

A tube produced in the same way, but without any centrifuging phase, has a diameter decreasing from the point of injection of the compressed air to the other end, and a greater length than the mandrel. On the other hand, it is not compressible and collapses on folding. The portions in relief have rounded edges of greater radius of curvature than that in the mandrel.

I claim:

1. Method of coating a body having an axis, said body being a solid of revolution about said axis, and having an external surface with projecting and recessed portions relatively further from and closer to said axis respectively, which comprises the steps of immersing the body in a fluidized bed of fusible synthetic polymeric coating material in powder form, the temperature of the body at the time of immersion being high enough to cause agglomeration by fusion of the powder particles to said body and to render the coating material in a plastic condition; rotating the immersed body about an axis; withdrawing the coated body from the fluidized bed of polymeric material; and rotating the body while the coating is still in said plastic condition at a speed, and for a time sufficient to permit the centrifugal transferrence of the coating material from the recessed portions to the projecting portions.

2. Method according to claim 1, wherein the speed of rotation of the body after withdrawal from the fluidized bed of polymeric material is 10 to 400 revolutions per minute faster than the speed of rotation of the body in the fluidized bed.

3. Method according to claim 2, wherein the speed of rotation after withdrawal is 50 to 200 revolutions per minute faster than the speed of rotation in the bed.

4. Method according to claim 1, wherein the synthetic polymeric material in powder form is a thermoplastic material.

5. Method according to claim 4, wherein the thermoplastic synthetic polymeric material is polyvinyl chloride, a copolymer of vinyl chloride and vinyl acetate, polystyrene, polyethylene, polypropylene, an ethylene-propylene copolymer, a polyamide, a linear polyester, 1,3-butadiene-styrene copolymer, an isoolefin or fluorinated thermoplastic resin.

6. Method according to claim 1, wherein the synthetic polymeric material is an epoxy resin, a cross-linkable polyester, a phenol-formaldehyde prepolymer or a silicone resin.

7. Method according to claim 1, wherein the body to be coated is a gearwheel, worm or screw.

8. Method according to claim 1, wherein the body is a metal mandrel suitable for producing a hollow moulded article with ribs or corrugations.

9. Method according to claim 1, wherein after rotation of the body at centrifuging speed, the coating is set and removed from the body as a hollow moulded article.

References Cited

UNITED STATES PATENTS

| | | | |
|---|---|---|---|
| 2,384,055 | 9/1945 | Tritt | 264—335 X |
| 2,844,489 | 7/1958 | Gemmer | 117—18 X |
| 2,880,109 | 3/1959 | Current et al. | 117—101 X |
| 3,023,121 | 2/1962 | Dyar | 117—101 X |
| 3,108,022 | 10/1963 | Church | 117—21 X |
| 3,161,530 | 12/1964 | Strobel | 117—21 X |
| 3,207,618 | 9/1965 | DeHart | 117—18 |
| 3,208,869 | 9/1965 | Starr et al. | 117—18 |
| 3,212,921 | 10/1965 | Plisken et al. | 117—101 |

MURRAY KATZ, Primary Examiner

P. F. ATTAGUILE, Assistant Examiner

U.S. Cl. X.R.

117—21, 101; 264—335